United States Patent Office 3,493,183
Patented Feb. 3, 1970

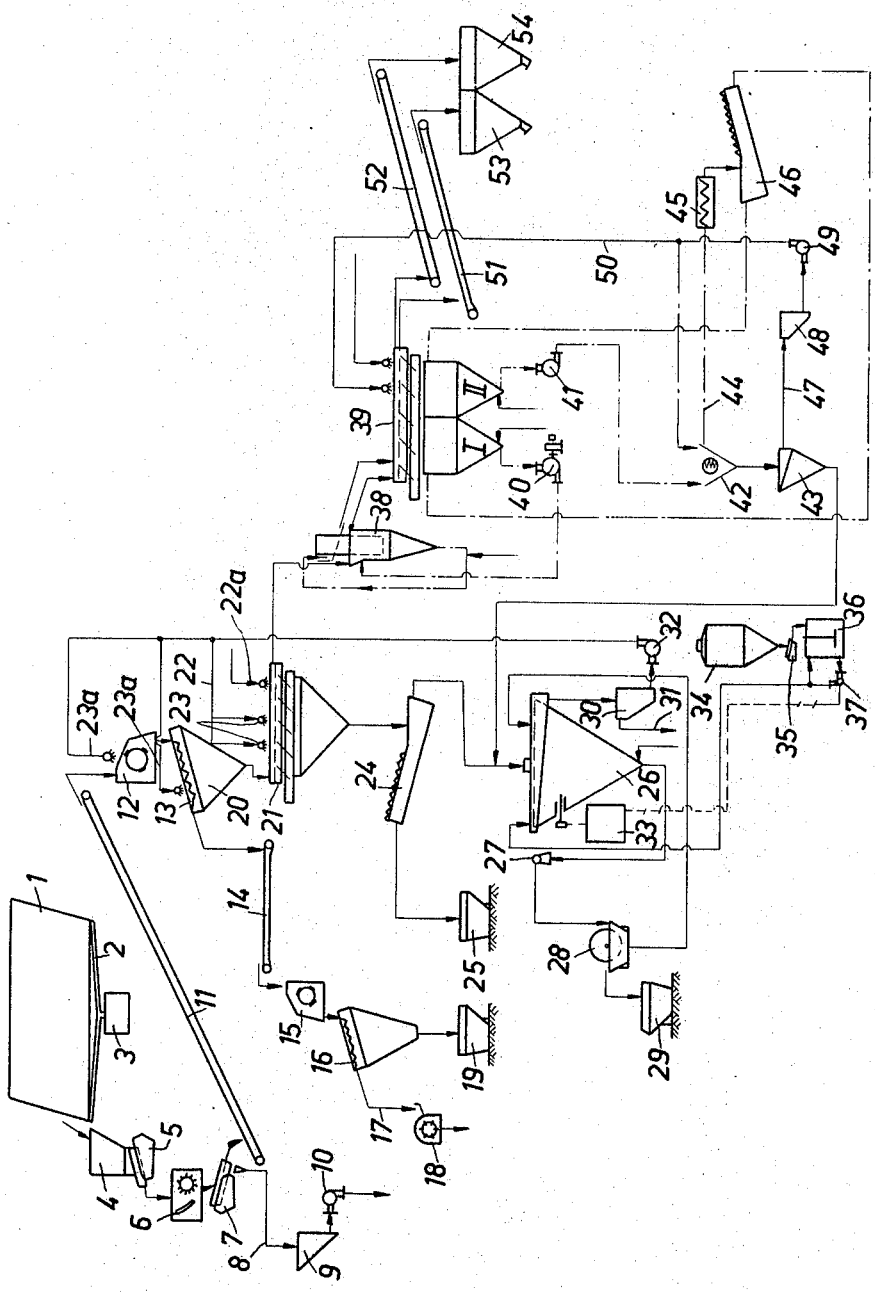

3,493,183
METHOD AND APPARATUS FOR SEGREGATING THE COMPONENTS OF SECONDARY CELLS
Reinhard Fischer, Ludolf Frank, and Günter Ebeling, Stolberg, Germany, assignors to Stolberger Zink Aktiengesellschaft fur Bergbau und Huettenbetrieb, Aachen, Germany
Filed May 25, 1966, Ser. No. 552,843
Claims priority, application Belgium, Nov. 24, 1965, 45,127
Int. Cl. B02c 17/02, 23/00; B07b 13/06
U.S. Cl. 241—24                                     13 Claims

ABSTRACT OF THE DISCLOSURE

The present invention relates to a process for separating the metallic and non-metallic components of secondary or lead-acid cells wherein the cells are fragmented and the components separated by screening and agitation.

---

The present invention relates to a method of segregating components of secondary cells. More specifically, the invention relates to a method of segregating the components of secondary cells of the type having a non-metallic housing, non-metallic separators, and metallic active material and grid plates. Still more specifically, the invention relates to a method as set forth above for recovering the lead content of such secondary cells.

Secondary or lead-acid cells essentially comprise a housing of non-metallic material, usually rubber or plastic, which may or may not be provided with metallic handles, grid plates, bridges, and terminal connectors of lead and of alloys which generally contain up to 9% of antimony (Sb), separators between the grid plates and generally consisting of plastic material, the acid with which the cell is filled, and the active material which fills the interstices of the grid plates and is practically free from antimony and which, depending on the degree of discharge of the cell, consists of lead oxide or lead sulphate.

The recovery of the various components going into the make-up of a cell of this type, and particularly the recovery of the lead, is economically important and much effort has gone into providing advantageous ways of making such recovery possible. In one known method the upper part of the battery with the connectors is removed, the housing is separated from the grid plates, and the acid is recovered at the same time. The housing is washed to remove any active material adhering to it and is thereupon discarded. The grid plates, however, are melted in a reverberatory furnace and the separated battery heads are fragmentized, whereupon their metallic fragments are separated from their non-metallic fragments, for example by air separation, and the metallic fragments are then melted. In the recovery of the lead content of lead-acid batteries it is desirable to obtain lead having as high as possible a content of antimony. The aforementioned recovery method, however, yields metals having a relatively low antimony content by melting down of the pole pieces and battery heads, and lead having only a medium antimony content by melting down of the grid metal and active material. The separators cannot be recovered since they are burned during melting of the grid plates and of the active material in the reverberatory furnace. Thus, this particular method requires not only an obviously considerable expenditure in terms of labor, but it yields lead having overall only a relatively low antimony content. Furthermore, it results in the loss of the separators which latter should desirably be recovered for reuse as raw material. Furthermore, working-up of the lead obtained with this method into either soft lead or a normal battery alloy is particularly complicated and rather expensive.

In another known method of recovering the lead the housing of the battery is removed by breaking it manually and by melting the bridges, connectors, grid blades and other components of the battery in a shaft- or reverberatory furnace, or by treating the inner components of the battery in accordance with a special process such as is described in German Patent 1,021,691. According to the process set forth in the above-mentioned German patent the battery scrap, which is preferably dry and does not, of course, include the housings, is fed into an impact crusher in which it is broken up to thereby separate the active material from grid-plate fragments. Subsequently, the active material is screened off from the grid-plate fragments and from the separators, which latter are manually removed. Proposals to use air separation for this latter purpose have in practice not been found satisfactory. The screening efficiency, that is the efficiency of removal of active material from the grid-plate fragments, depends on the varying moisture content of the fragmented scrap and it is therefore necessary periodically to exchange the sieve linings which become blocked by the moist particles. In other words, the moister the scrap is the larger must be the mesh of the sieve used to overcome this blocking effect; this, on the other hand, results in an increase in the proportion of such coarse metallic grid parts or of parts with a high antimony content which passes through the sieve along with the active material. This, in turn, means poor separation of the antimony. Again, the screen reject, that is that material which cannot pass through the sieve, contains a relatively large amount of non-metallic material such as the battery sealing compound, separators and the like, so that the screen reject, which should ideally include only fragments of the grid plates, must be melted down under particularly difficult conditions.

Briefly stated, the disadvantages of known recovery processes of the type herein question can be summarized by saying that they do not result in proper separation of the components; are technically complicated and require special processing stages for subsequent treatment of the products obtained; and do not permit recovery of all of the constituent components of the cell.

It is therefore a general object of the present invention to overcome the disadvantages of previously known recovery processes of the type in question.

A more specific object of the invention is to provide a method of segregating the components of secondary cells for the purpose of recovering such components.

A still more specific object of the invention is to segregate and recover such components to the maximum possible extent.

An additional object of the invention is to enable such segregation and recovery of the components in a simple, fully automatic and inexpensive manner.

In accordance with one feature of the invention we therefore provide a method of segregating the components of secondary cells of the type having a non-metallic housing, non-metallic separators, and metallic active material and grid plates. This method comprises the steps of fragmentizing the cells so as to obtain a mass of fragments, dividing the mass thus obtained into a first fraction which comprises the separators and into a second fraction which comprises at least the major part of the housing and of the metallic fragments, and thereupon segregating the second fraction by weight into metallic and non-metallic fragments preparatory to further processing.

Briefly stated, the recovery process proceeds as follows: The cells are delivered to a storage area which, in view of the fact that the cells are still acid-filled, must be constructed so as to be acid resistant. For instance, the floor of the storage area may be acid resistant and is preferably provided with a drainage means for the acid. In this storage area the cells are repeatedly picked up and dropped by suitable mechanical means, such as grab cranes, shovel loaders or the like. It has been found that dropping these cells from a height of approximately 4 meters will satisfactorily cause them to break so that the acid still contained therein can drain. The cell fragments, which are still relatively large, are then placed into a crusher where the housings are broken down further. Subsequently, any acid still adhering to the fragments is largely removed by passing the fragments through a dewatering passage. Thus prepared, the mass of fragments which includes all constituent components of the cell, is fed into a crusher, e.g. an impact crusher which breaks the fragments into still smaller pieces. The degree of fragmentation depends to a very large extent on the speed of rotation of this impact crusher and it has been found that a rate of 30–40 meters per second is particularly suitable for the purpose at hand.

Upon leaving the impact crusher the mass of fragments is fed onto a screen, preferably of the vibratory drum type, which screens off the separators. This is accomplished by using a screen mesh of between 60 and 80 mm. and by assuring that the mass of fragments is constantly being agitated so that it will be frequently turned over. Thus, the separators which are too large to pass through the screen mesh, cannot remain stationary in one place and thereby block passage of the other fragments.

The fragments which have passed through the screen, the so-called "undersize," are conveyed to a wet-screening passage, for instance a resonance washing screen having a screen lining with a mesh of 3–5 mm. It is essential in accordance with the invention that the screening process at this stage be of the wet-screening type. This step removes the last traces of acid still adhering to the fragments and accordingly the now contaminated liquid, namely water, utilized for this wet-screening step is neutralized before it is recirculated to the top of the screen for re-use.

The separators which have not passed through the screen are removed for further processing which will be explained in detail later on. Meanwhile, those fragments which have moved to the wet-screening passage are therein separated into "oversize" and "undersize" fragments, that is fragments which can not pass through the screen and those which are small enough to pass through the 3–5 mm. mesh of the screen. The "oversize" fragments which include grid metal, pole bridges, and housing fragments as well as other metallic parts, such as iron handles if any, pass on to a device wherein the fragments can be separated according to their specific gravity, and the materials of high specific gravity, that is the metal fragments, are conveyed via a washing and de-watering screen to the recovery bin. The fragments collected in this bin consist mainly of the grid metal including the pole bridges. The fragments of lower specific gravity, that is those which float and which include mainly housing fragments, are also washed and de-watered and, since at this point they are practically free from any adhering lead, can be discarded or else recovered for other uses.

The "undersize" of the screen with its 3–5 mm. mesh, on the other hand, enters a further separation stage and it has been found that in this stage a screen is not suitable. However, a gravity classifier of the type comprising a spiral concentrator which is well known in the art, is very suitable for this purpose. The underflow of this classifier, that is the heavier particles which sink in the classifier and which are relatively rich in antimony, are removed from the classifier by the spiral concentrator and led to a collection bin. The overflow of the classifier contains only slime and lighter organic particles and can be cleared in a settling cone without any caking problems. In this manner the finer particles of low antimony content are separated from such relatively coarse particles as are still contained in the underflow.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which the single figure is a flow chart showing diagrammatically an arrangement for carrying out the method of the invention.

In the drawing reference numeral 1 identifies a storage area or dump consisting of a bunker with raised walls. This dump 1 has an acid-resistant floor 2 which slopes toward a drain below which there is arranged an acid-collecting tank 3. The secondary cells whose components are to be segregated are delivered to the dump 1, for example by truck, and are there lifted by a suitable mechanical device, such as a crane or a power shovel, and dropped from a height of approximately 4 meters onto the floor 2. This results in breakage of at least the cell housings and any acid contained in the cells thus runs out and is collected in the tank 3. The broken cells are then placed into a feed hopper 4 from where they pass via a suitable feed 5, which may be simply a chute for gravity feeding or else a conveyor, to a roll crusher 6 where the housings are broken into still smaller fragments. From the roll crusher 6 the fragmented material passes to an acid-resistant screen conveyer 7 and during movement of the material along this conveyer most of the still adhering acid runs off through the screen of the conveyer and into an acid storage tank 9 by way of a conduit 8. Advantageously, the acid collected in acid tank 3 may be added to that in tank 9 and the total quantity is then removed for further use by means of a pump 10.

Having thus been freed from at least the major portion of the acid the fragmented material moves to a conveyer belt 11, which in the drawing is shown to slope upwardly. On reaching the end of the conveyer belt 11 the material drops into an impact crusher 12 which advantageously will be arranged to operate at 30–40 meters per second. Having been impacted in the impact crusher 12, the fragmented material passes out of the crusher and onto a screen 13 having a mesh of 60–80 mm. The "oversize" of the screen 13, that is such fragments as are too large to pass through the mesh, namely the separators, passes from the screen to a conveyer belt 14 and from there to a further impact crusher 15 which is preferably provided with a magnetic separator so that any ferrous material can be removed. The remainder, now consisting substantially of separators and finely divided lead, is impacted again in the impact crusher 15 after the ferrous material has been removed. Subsequently, the fragmented material passes from impact crusher 15 to a screen 16 having a mesh of less than 80 mm. and whereon the separators are finally freed from any residues of lead which still adhere to them. Such residues pass through the screen 16 and consist mainly of grid lead which is collected in a bin 19. The separators which have been retained on the screen 16 pass via a suitable conveyance, such as a gravity chute 17, into a cutting mill 18 where they are cut up for use as raw material in plastics manufacturing. It should be noted that the impact crusher 15, screen 16 and cutting mill 18 can be replaced by a cutting mill having air separation wherein the cut separators, which are usually of polyvinyl chloride, are separated from the lead by an air stream.

Returning now to the material which has passed through the screen 13, the so-called "undersize," this enters into a collecting bin 20 and passes to the resonance washing screen conveyer 21 where it is washed with a combination of recirculated and fresh water supplied to the washing nozzles 23 by pipes 22 and 22a. The origin of the recirculated water will become apparent presently. Screen 21 has a mesh of 3–5 mm. and the material which is small enough to pass through this mesh enters the gravity separator 24, together with the wash liquor. Gravity separators or tanks of this type are well known in the art and it simply remains to point out that the use of a spiral concentrator, that is a feed screw, in the gravity concentrator 24 is advantageous, together with a sieve or screen for the overflow so as to separate as much as possible, all organic matter. The underflow of the gravity separator 24, that is the heavier particles which have settled at the bottom of the separator and are engaged by the spiral concentrator, is collected into the bin 25 and consists of antimony-containing grid lead and lead compounds. The overflow of the separator 24 contains slime and lighter plastic parts and enters a settling cone 26 having downwardly converging walls which preferably have an inclination of approximately 60° with reference to a vertical plane of symmetry of the cone. From there, the underflow is passed to a drum filter 28 via a pump 27. During filtration in the drum filter 28 a filter cake, consisting in the main of active material, develops and is collected in a container or bin 29. The filtrate leaving the filter 28 is conveyed, together with the overflow of cone 26, to the sump 30 of pump 27. It should be noted that this is not done directly, but rather that the filtrate is recirculated to the top of the cone 26 so that it passes from there into the sump 30 as overflow. Of course, the filtrate could also be conveyed directly into the sump 30. Excess water is removed from the sump through an overflow 31 provided therein.

There is also provided a pump 32 which communicates with the sump 30 for withdrawing water therefrom and delivering it to the pipe 22 for the purpose of washing the material on the resonance screen conveyer 21. To maintain a certain pH in this water a neutralizing solution is added to the settling cone 26 by means of a pH metering and control device 33 of conventional construction. The neutralizing solution is prepared by adding neutralizing agents, such as lime, from the storage bin 34 via a metering device 35 into a stirrer 36. From there it is delivered via a pump 37 to the cone 26.

It will be recalled that fragments too large to pass through the mesh of the resonance washing screen conveyer 21 were retained by that screen. Those fragments are conveyed from the screen 21 by any suitable means to a lifting wheel separator 38 where they are separated by weight into sinkable material, mainly comprising grid metal, pole bridges and such other metallic parts as handles, and floating material which includes fragments of the housings. The sinkable material and the floating material are separately conveyed to a common screen 39 of the conveyor type. The screen, which may be a screen-type conveyor belt, travels in direction from the left towards the right in the drawing, and it will be seen that from the first section of this screen, that is from the section which in the drawing is to the left, the slurry delivered by the lifting wheel separator 32 flows through the screen into a cone I arranged below this first section. From there it is returned to the lifting wheel separator 38 by pump 40. Arranged below the rear or right hand section of screen 39 is a second cone II, and as the material passes over this rear section it is showered with a combination of fresh and recirculated water, and this washing liquor is collected in the cone II below the screen 39. The washing liquor removes additional particulate material from the fragments being showered and thus a thin slurry is collected in the cone II. This slurry is delivered by means of the pump 41 to a magnetic separator 42 where solids are separated from the liquid. The overflow from this separator 42 is concentrated in a cone 43 and it is at this point that a sludge of active material is obtained which is then discharged from the cone 43 into the top of the concentrating cone 26.

The overflow from the magnetic separator 42 is delivered to a spiral concentrator 45 via a conduit 44 and is passed through a demagnetizing coil, whereupon it is then fed into the cone I to maintain in the lifting wheel separator 38 the necessary pulp density. The overflow from the concentrating cone 43 passes through the conduit 47 into a sump 48 from where it is delivered via pipe 50 by pump 49 to the screen 39 as showering water. The washed floatable material, as well as the sinkable material, are separately conveyed to silos, 53, 54 via suitable means, such as the conveyor belts 51 and 52 shown in the drawing.

It should be noted that all such devices as have not been herein specifically described as to their construction, are conventional and well known to those skilled in this art.

It will be understood that each of the elements described above, or two or more together, may also find a useful application in other types of method and apparatus for segregating the components of secondary cells differing from the types described above.

While the invention has been illustrated and described as embodied in a method for segregating the components of secondary cells, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be secured by Letters Patent is:

1. A method of segregating the components of secondary cells of the type having a non-metallic housing, non-metallic separators, and metallic active material and grid plates, comprising the steps of fragmentizing the cells to obtain a mass of fragments; passing said mass of fragments over a screen having openings of a mesh retaining a first fraction comprising the separators and permitting a second fraction comprising at least the major part of the housings and of the metallic fragments to pass through said screen; agitating the retained separators on said screen; and segregating said second fraction by weight into metallic and non-metallic fragments preparatory to further processing.

2. A method as defined in claim 1, wherein the step of fragmentizing said cells comprises dropping said cells onto a hard surface so as to obtain initial breakage.

3. A method as defined in claim 1, wherein the step of fragmentizing said cells comprises dropping said cells onto a hard surface so as to obtain large fragments, and subsequently crushing said large fragments for reducing the size thereof and obtaining smaller fragments.

4. A method as defined in claim 3, and further comprising the step of removing from said cells any acid contained therein during and after fragmentizing thereof and prior to dividing of said mass into said fractions.

5. A method as defined in claim 1, further comprising the step of segregating the separators from any metallic material in said first fraction.

6. A method as defined in claim 1 and further comprising the step of prior to segregating said second fraction, subdividing the latter into a portion consisting of smaller fragments and another portion consisting of larger fragments.

7. A method as defined in claim 6, wherein the size of said smaller fragments at most equals 5 mm.

8. A method of segregating the components of secondary cells of the type having a non-metallic housing, non-metallic separators, and metallic active material and grid plates, comprising the steps of fragmentizing the cells to obtain a mass of fragments; dividing said mass into a first fraction comprising the separators and a second fraction comprising at least the major part of the housings and of the metallic fragments; wetting and passing said second fraction over a screen having a mesh of predetermined size so as to subdivide said second fraction into one portion consisting of smaller fragments and another portion consisting of larger fragments; and segregating said portions by weight into metallic and non-metallic fragments.

9. A method as defined in claim 8, wherein said second fraction is wetted with chemically neturalized water.

10. A method as defined in claim 9, wherein said water carries said smaller fragments of said one portion through said openings of said screen; and further comprising the step of separating metallic particles from plastic particles by weight.

11. A method as defined in claim 7, wherein said other portion is separated by weight into metallic and non-metallic fragments.

12. A method as defined in claim 8, wherein said screen has a mesh of at most 5 mm.

13. A method as defined in claim 8, wherein said second fraction is wetted while passing over said screen.

References Cited

UNITED STATES PATENTS

| | | | |
|---|---|---|---|
| 2,091,772 | 8/1937 | Steele | 241—5 |
| 2,264,204 | 11/1941 | Heckett | 241—14 |
| 2,962,229 | 11/1960 | Meissner | 241—5 |
| 3,004,721 | 10/1961 | Notzold | 241—5 |
| 3,086,718 | 4/1963 | Lukas | 241—24 |
| 3,359,966 | 8/1967 | Haveman | 241—14 |
| 3,341,134 | 9/1967 | Meloy | 241—5 |

HARRISON L. HINSON, Primary Examiner

U.S. Cl. X.R.

241—78